United States Patent
Rufini et al.

(10) Patent No.: US 6,202,893 B1
(45) Date of Patent: Mar. 20, 2001

(54) SANITARY DISPENSER FOR COLLAPSIBLE CONTAINERS

(75) Inventors: Brian M. Rufini, Andover, CT (US); Nathaniel M. Beale, 89 Old Shirley Rd., Harvard, MA (US) 01451

(73) Assignee: Nathaniel M. Beale, Harvard, MA (US)

( * ) Notice: Subject to any disclaimer, the term of this patent is extended or adjusted under 35 U.S.C. 154(b) by 0 days.

(21) Appl. No.: 09/391,293

(22) Filed: Sep. 7, 1999

(51) Int. Cl.$^7$ .............................. F16K 7/06; B65D 35/28
(52) U.S. Cl. ................... 222/103; 222/179; 251/9
(58) Field of Search .................... 222/103, 95, 179; 251/4, 9

(56) References Cited

U.S. PATENT DOCUMENTS

| | | |
|---|---|---|
| 1,507,464 | 9/1924 | Clegg . |
| 2,210,226 | 8/1940 | Weisberger . |
| 2,260,346 | 10/1941 | Spencer . |
| 2,628,744 | 2/1953 | Mowbray . |
| 2,652,952 | 9/1953 | Mowbray . |
| 2,721,675 | 10/1955 | Buras, Jr. . |
| 2,781,951 | 2/1957 | Hanford . |
| 3,233,787 | 2/1966 | Ross . |
| 3,659,512 | * 5/1972 | Dietz et al. ............ 222/103 X |
| 4,187,845 | * 2/1980 | Dror ................ 222/179 X |
| 4,228,926 | 10/1980 | Gordon . |
| 4,899,911 | * 2/1990 | Rohde et al. .......... 222/103 |
| 5,217,144 | 6/1993 | Santefort et al. . |
| 5,232,027 | * 8/1993 | Tanaka et al. ........ 222/103 X |
| 5,281,202 | 1/1994 | Weber et al. . |
| 5,996,851 | * 12/1999 | Dolan et al. .......... 222/179 |
| 6,041,977 | * 3/2000 | Lisi ................ 222/179 X |

* cited by examiner

Primary Examiner—Kevin Shaver
Assistant Examiner—Eric Keasel
(74) Attorney, Agent, or Firm—Kirk Teska; Iandiorio & Teska

(57) ABSTRACT

A sanitary dispenser for a collapsible container includes first and second plates for receiving therebetween a collapsible container of material to be dispensed; a cam in cooperation with at least one of the first and second plates to urge the at least one plate toward the other to collapse the container to dispense a metered amount of material and an actuator subsystem for rotating the cam when a metered amount of material is desired for use.

14 Claims, 4 Drawing Sheets

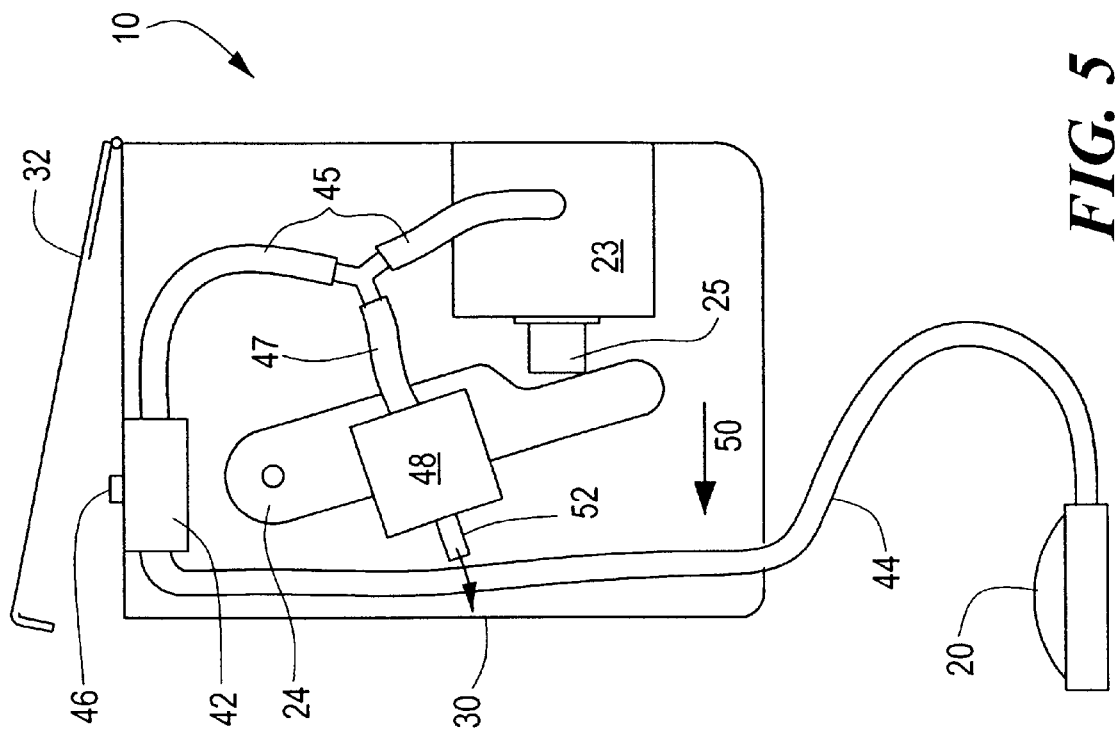
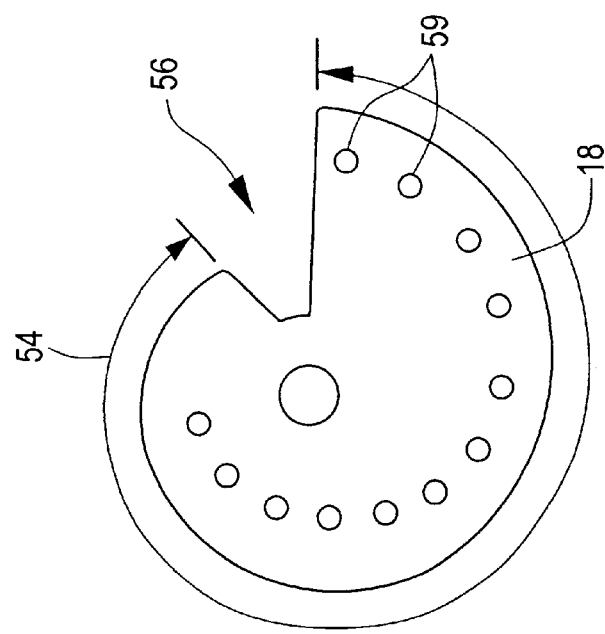

SANITARY DISPENSER FOR COLLAPSIBLE CONTAINERS

FIELD OF INVENTION

This invention relates to dispensers for collapsible containers, and more particularly to a sanitary dispenser for collapsible containers which dispenses a metered amount of fluid.

BACKGROUND OF INVENTION

In the medical field it is critical to maintain sanitary conditions in order to prevent the spread of bacteria from one patient to another, or cross infect patients. This is particularly true when dealing with women's health issues and endoscopies which require the use of lubricating fluid or gel to examine the patient. These lubricants come in large tubes and also in small single use foil packets.

However, large tubes contain much more lubricant than required for a single examination, while the smaller packets typically do not contain enough lubricant, requiring the physician's assistant to repeatedly open the packets for the physician which is a time consuming and cumbersome process. Moreover, once the physician's hand touches the end of a tube, that tube becomes contaminated and may not be used on other patients, thus wasting the remaining contents of the tube and thus inventory.

A typical hospital may remove from inventory as many as eighty tubes of lubricant per day, most of which is not actually used, but rather is unused and destroyed as a result of contamination of the tube as mentioned above.

BRIEF SUMMARY OF THE INVENTION

It is therefore an object of this invention to provide a sanitary dispenser for a collapsible container which dispenses substantially all of the contents of the container as needed and without waste.

It is a further object of this invention to provide such a dispenser which dispenses a metered amount of the contents without risk of contaminating the container.

It is a further object of this invention to provide such a dispenser which prevents cross infection of patients.

It is a further object of this invention to provide such a dispenser which may be operated by a single person.

It is a further object of this invention to provide such a dispenser which minimizes waste of the contents.

It is a further object of this invention to provide such a dispenser which saves money by reducing content waste.

The invention results from the realization that a truly sanitary and efficient dispenser for a collapsible container can be achieved in an apparatus having two plates on opposite sides of the collapsible container for holding it and a cam for urging the plates together to compress the collapsible container and to uniformly dispense metered amounts and then eventually substantially all of the contents from the container as needed without waste, the cam having a fall or a notch so that after the plates are almost together and the full contents of the collapsible container have been dispensed in one revolution of the cam, the plates automatically retract and separate for removing and replacing the empty container whereupon the dispensing process begins again with a new collapsible container.

This invention features a sanitary dispenser for a collapsible container. First and second spaced plates receive between them a collapsible container of material to be dispensed. A rotatable cam urges the at least one of the plates toward the other to collapse the container to dispense a metered amount of material. An actuator subsystem rotates the cam.

The cam preferably includes a fall for releasing the plates and to remove the collapsed container. A spring urges the first and second plates apart. One of the first and second plates typically includes a channel, facing the other plate, for directing material out of the container as the plates compress the container.

The actuator subsystem preferably includes a clutch. The actuator subsystem also may include an arm connected on one end to the clutch and a piston driver device for pivoting the arm. A foot pedal actuates the piston driver device. The piston driver device may be pneumatic. A pressure release valve is preferably included for depressurizing the piston driver device each time the cam is rotated.

The plates may include pivot means responsive to the collapsible container, for allowing the plates to maintain even pressure on the container to uniformly empty the fluid from the container.

The first and second plates, the rotatable cam, and the actuator subsystem are preferably enclosed in a stainless steel housing.

This invention features a sanitary dispenser for a collapsible container, the dispenser comprising: first and second plates for receiving therebetween a collapsible container of material to be dispensed, at least the first plate movable with respect to the second plate, the first plate including a cam follower; a cam positioned in cooperation with the cam follower, the cam including a fall which receives the cam follower; and an actuator subsystem for rotating the cam, the actuator subsystem including a clutch mechanism connected to the cam, a pivotable arm connected to the clutch mechanism, a piston driver positioned to move the arm, and a pump for activating the piston driver to move the arm and engage the clutch mechanism to rotate the cam by a predetermined amount to move the first plate and dispense a portion of the material from the collapsible container until the fall receives the cam follower.

Springs may be included for biasing the first plate in a spaced relationship with respect to the second plate to urge the plates apart when the fall of the cam receives the cam follower.

BRIEF DESCRIPTION OF THE DRAWINGS

Other objects, features and advantages will occur to those skilled in the art from the following description of a preferred embodiment and the accompanying drawings, in which:

FIG. 3 is a schematic view of the cam used to dispense the entire contents of a container according to the present invention;

FIG. 5 is a cross-sectional view, similar to FIG. 4, demonstrating the pneumatic pump and piston which drive the cam and the pressure release valves which maintain the dispenser at normal pressure.

PREFERRED EMBODIMENT

Figure 1:
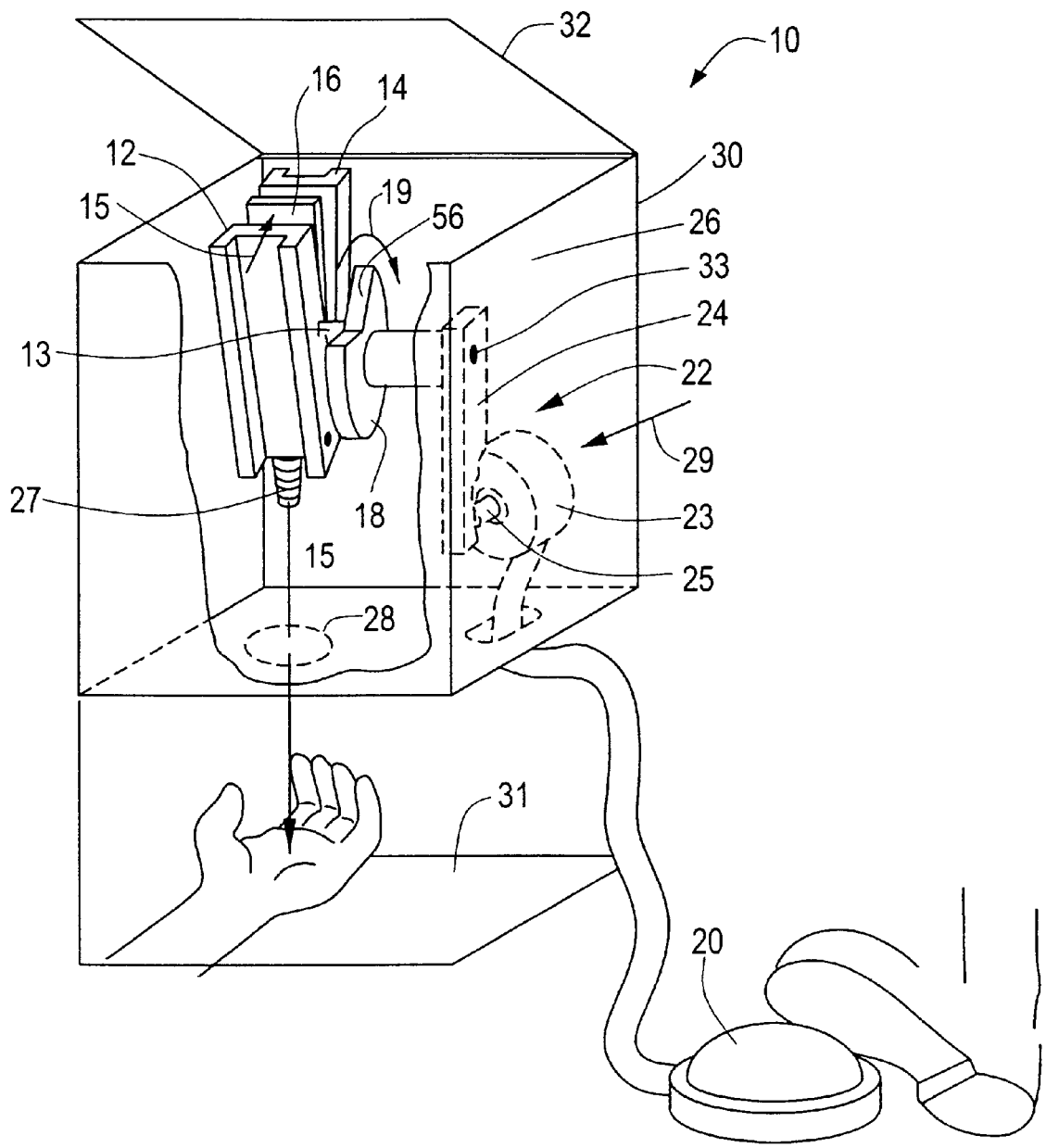
FIG. 1 is a schematic three dimensional, partially cut-a-way view of the dispenser according to the present invention shown generally.

Dispenser 10, FIG. 1, is shown generally to include housing 30 and therein first plate 12 and opposing second plate 14 which collapse tube or collapsible container 16 placed therebetween. Plates 12 and 14 are slowly urged together by cam 18 as it rotates in a direction indicated by arrow 19 to dispense a metered amount of contents from container 16. Plate 14 may be substantially fixed, the container slowly collapsing as plate 12 is moved toward plate 14 via pivot point 15. In the preferred embodiment, cam 18 is slowly driven (rotated) by activator subsystem 22 which includes double clutch mechanism 26 activated by arm 24 which is actuated by piston driver 23 which in turn is activated by foot pump 20. Each compression of foot pump 20 turns cam 18 slightly which, by virtue of cam follower 13 on plate 12, urges plate 12 closer to plate 14 squeezing a metered amount of the contents of collapsible container out of its open end.

In operation, foot pump 20 is compressed by the user to activate activator subsystem 22. Activator subsystem 22 may include pneumatically driven piston driver 23 and arm 24 which engages double clutch mechanism 26, attached to cam 18, to rotate cam 18 closing plates 12 and 14 to dispense the contents of container 16 out of end 27 through aperture 28 in housing 30. In this way, the contents of collapsible container 16 may be dispensed into the user's (e.g., a physician's) hand in the specific amount required by the user without the user having to touch or contaminate end 27 of container 16. Each compression of foot pump 20 provides a metered amount of air to piston driver 23 driving piston 25 in the direction of arrow 29. Piston 25 pushes against the lower end of arm 24 which pivots about pivot point 33. This action activates double clutch mechanism 26 which in turn rotates cam 18 slightly. Cam 18 engages cam follower 13 attached to plate 12 thus driving plate 12 in the direction of arrow 15 until, when the plates are almost together and the contents of container 16 nearly empty, fall or notch 56 is encountered which allows plate 12 to automatically return to its original position. Drip plate 31 may be provided to catch residual fluid which drips from container 16.

Figure 2:
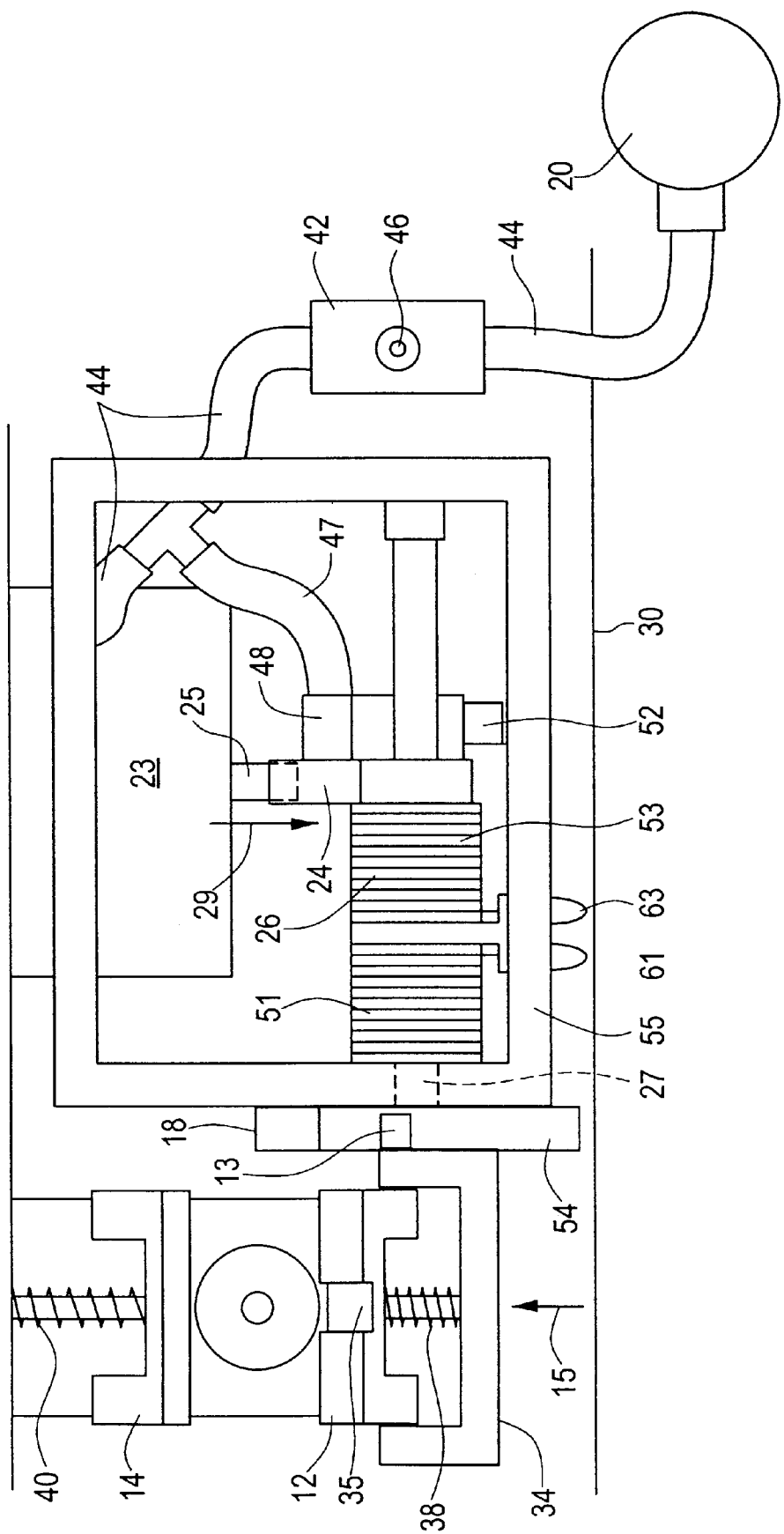
FIG. 2 is a top schematic view of the dispenser of FIG. 1.

Plate 12, FIG. 2, may be mounted to plate bracket 34 which includes projection or cam follower 13 which engages circumference 54 of cam 18. However, this is not a necessary limitation of the invention as plate 12 may include projection 13, as shown in FIG. 1, without the need of bracket 34. There may also be a channel 35 on plate 12 or plate 14 which directs the contents of container 16 to end 27 as container 16 is collapsed. As cam 18 rotates, the top of plate bracket 34 moves in the direction of arrow 15 toward plate 14 urging plate 12 toward plate 14 to dispense the contents of container 16. Plates 12 and 14 may be pivotably mounted, as shown in greater detail with reference to FIG. 4, such that as plates 12 and 14 are urged together, plates 12 and 14 uniformly compress container 16 to dispense the contents of container 16.

Safety pressure valve 42 may be included between pump 20 and piston driver 23 along conduit 44 as will be discussed in more detail with reference to FIG. 5. Valve 42 is opened when lid 32, FIG. 1, is closed to allow air from foot pump 20 to pass to piston driver 23. In this way, dispenser 10 cannot be used unless lid 32 is closed, thereby preventing a user from having their fingers or hand pinched between plates 12 and 14.

Piston 25 drives arm 24 to rotate double clutch mechanism 26 which is attached to and rotates cam 18 to drive plates 12 and 14 closer together. In the preferred embodiment, double clutch mechanism 26, FIG. 2 includes two overrunning spring clutches on shaft 27 (see for example U.S. Pat. No. 3,835,972) one of which operates as a brake clutch 151 and one of which operates as a drive clutch 53. Brake clutch 151 is secured to outer housing 55 and keeps drive clutch 53 from releasing on the down stroke of arm 24. Drive clutch 53 is secured to drive shaft 27 and cam 18. Also included in the clutch design are safety tines which when pushed opposite the direction of drive release the clutch so to allow cam reversing when, for example a tube is installed without end being punctured or if loaded improperly. In this way, the cam can be reversed to remove an improperly loaded container. Cam 18 has holes 59 to allow a grip for reversing as shown on FIG. 3. Precision ground square wire springs are mounted on specific diameter drive hub 27, FIG. 2. The springs grip hub 22 when pushed in the direction of the spring wrap. When pushed opposite direction, the springs expand thus releasing from hub allowing slip. The push or hold on the spring is via tines 61 and 63 attached to either the drive arm or the drive housing. The hubs are also affixed to either the drive axle or drive housing in the case of the braking clutch.

Arm 24, FIG. 1 should be sufficiently long so that piston 25 may extend to its full length on each stroke so that each pump of foot pump 20 will dispense a sufficient amount of the contents from container 16. However, the cam configuration, the cam follower, or clutch 26 can be adjusted to control the amount of the contents dispensed from container 16. The present invention is not, however, limited to pneumatic pumps and pistons, as piston driver 23 could be, for example, an electric motor or solenoid and foot pedal 20 could be an electric foot switch or alternate air supply. This design would eliminate the need for arm 24, piston driver 23 and/or double clutch mechanism 26. Thus, activator subsystem 22 could be any device or and combination of devices which cause the rotation of cam 18.

Circumference 54, FIG. 3, of cam 18 is designed to dispense the entire contents of a collapsible container or tube prior to resetting. Thus the rise of cam 18 is a function of the size of the typical container to be emptied as well as the amount to be dispensed each time. Varying the rise of cam 18 also will vary how much plate 12 moves toward plate 14 and thus determine the amount of the contents dispensed each time. Therefore, the rise of cam 18 permits dispensing a metered amount of content from container 16 each time cam 18 is actuated. Cam 18 preferably includes fall 56 which, upon one complete rotation of cam 18, receives cam follower 13, FIG. 2, which causes plates 12 and 14 to fully and rather quickly separate in order to replace the now empty container. It is also desirable that cam 18 have a radical rise so that plates 12 and 14 will quickly engage container 16, FIG. 1, to begin dispensing its contents with only a few pumps of foot pump 20.

Figure 4:
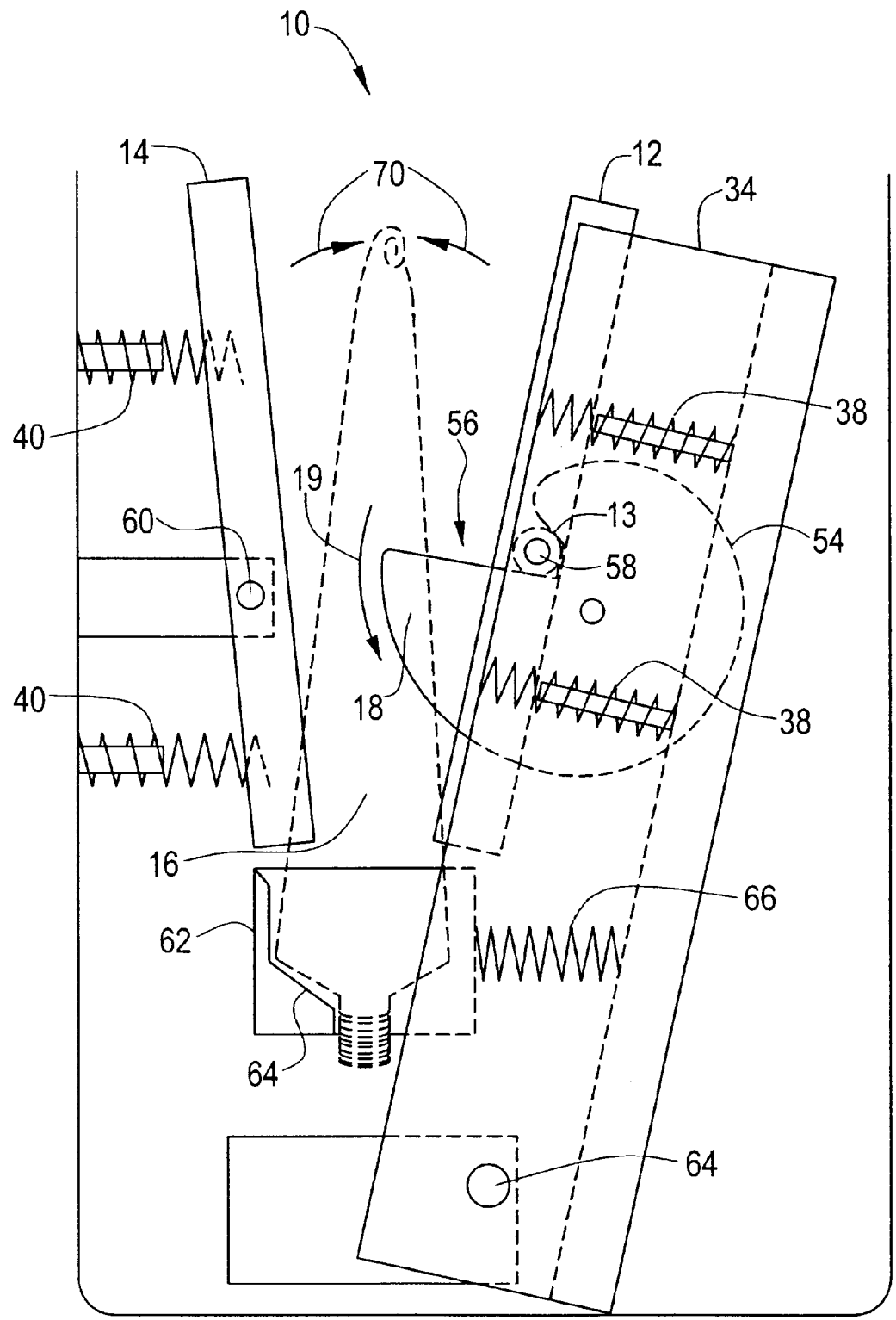
FIG. 4 is a cross-sectional view of the dispenser of FIG. 1, including the cam and the plates which are used to collapse the container and dispense its contents.

Plates 12 and 14, FIG. 4, may be pivotably hinged about axis 58 and 60, respectively, such that as plate 12 is urged toward plate 14 by cam 18, springs 38 and 40 push on plates 12 and 14, respectively, to maintain even pressure on collapsible container 16 to uniformly dispense its contents. Collapsible container 16 is held in place by holder 52 which may include chamfered opening 64 to receive and securely hold the dispensing end of container 16 therein. Plate bracket 34 is hinged at pin 64 such that when cam follower 13, shown in phantom, enters fall 56, clamp release spring 66 pushes back on plate bracket 34 to fully separate plates 12 and 14. This spring also keeps constant pressure on cam 18 with respect to follower 13.

As cam 18 is rotated in a direction as indicated by arrow 19, cam follower 13 cooperates with or follows circumference rise and fall 54 of cam 18 to drive plates 12 and 14 together as indicated by arrows 70 to dispense a metered amount of the contents of container 16.

System 10, FIG. 5, may include a pressure relief subsystem so that the pressure does not build up and become so great that foot pedal 20 can no longer be pumped. Foot pump 20, for example a pneumatic foot pump available from Highland Labs, Ashland, Mass., is connected via air line 44 to safety pressure release valve 42. As mentioned above, pressure release valve 42 is provided as a safety feature. Air may only pass to piston driver 23 when lid 32 is closed thereby depressing valve piston 46 and releasing pressure through the auxiliary part. Each time air is pumped into piston driver 23, piston 25 extends drive arm 24 forward as indicated by arrow 50. To prevent the build up of pressure in the system which would cause the check valve in the foot pump to stay closed and make depressing foot pump 20 too difficult or even impossible, pressure release valve 48 is introduced into the system via air line 47 which is split off from air line 45. As piston 25 drives arm 24 forward, pressure release valve piston rod 52 of valve 48 engages housing 30, depressing button 52 to release built up pressure in lines 44 and 45 through an auxiliary port. Thus, every time foot pedal 20 is pumped to dispense the contents of the container, the pressure in the system is released as the air is dispensed and the system is ready for the next cycle.

The dispenser according the present invention permits a metered amount of the contents of a collapsible container to be dispensed without risk of contamination into the tube or its contents. Moreover, the contents of the tube may be used completely, rather than only a portion of it, prior to discarding the container and unused contents. The amount of product dispensed is a function of the configuration of cam 18, the motion of double clutch mechanism 26 and the travel of arm 24. Thus, the metered amount of product dispensed may be adjusted in a number of ways.

Although specific features of the invention are shown in some drawings and not in others, this is for convenience only as each feature may be combined with any or all of the other features in accordance with the invention. For example, actuator subsystem 22, FIG. 1, including arm 24, and piston driver 23 could be replaced with a motor which rotates, either directly or through double clutch mechanism 26, cam 18, and a switch for turning the motor on and off or a switch for activating the motor for a predetermined period of time.

Other embodiments will occur to those skilled in the art and are within the following claims:

What is claimed is:

1. A sanitary dispenser for a collapsible container containing material to be dispensed, the dispenser comprising:
   first and second spaced plates for receiving therebetween the collapsible container of material to be dispensed;
   a rotatable cam and a cam follower in cooperation with at least one of the first and second plates to urge the at least one plate toward the other to compress the container to dispense a metered amount of the material; and
   an actuator subsystem for rotating the cam, the actuator subsystem including a clutch mechanism having a drive clutch and a break clutch each including a spring.

2. The dispenser of claim 1 in which the cam includes a fall for separating the plates to remove the collapsed container.

3. The dispenser of claim 1 further including a third spring, responsive to the at least one plate for urging the first and second plates apart.

4. The dispenser of claim 1 in which one of the first and second plates includes a channel, facing the other plate, for directing fluid out of the container as the plates compress the container.

5. The dispenser of claim 1 in which the said at least one plate is pivotably mounted to a bracket to maintain even pressure on the container to uniformly empty the fluid from the container.

6. The dispenser of claim 1 in which the first and second plates, the rotatable cam, and the actuator subsystem are enclosed in a housing.

7. The dispenser of claim 1 in which the actuator subsystem further includes an arm connected on one end to the clutch mechanism and a piston driver device for pivoting the arm.

8. The dispenser of claim 7 further including an electric motor for actuating the piston driver device.

9. The dispenser of claim 7 further including a foot pedal for actuating the piston driver device.

10. The dispenser of claim 9 in which the piston driver device is pneumatic.

11. The dispenser of claim 10 further including a pressure release valve for depressurizing the piston driver each time the cam is rotated.

12. A sanitary dispenser for a collapsible container containing material to be dispensed, the dispenser comprising:
   first and second plates for receiving therebetween the collapsible container of material to be dispensed, at least the first plate movable with respect to the second plate, the first plate including a cam follower;
   a cam positioned in cooperation with the cam follower, the cam including a fall which receives the cam follower; and
   an actuator subsystem for rotating the cam, the actuator subsystem including:
      a clutch mechanism connected to the cam,
      a pivotable arm connected to the clutch mechanism,
      a piston driver positioned to move the arm, and
      a pump for activating the piston driver to move the aim and engage the clutch mechanism to rotate the cam by a predetermined amount to move the first plate and dispense a portion of the material from the collapsible container until the fall receives the cam follower.

13. The dispenser of claim 12 further including springs for biasing the first plate in a spaced relationship with respect to the second plate to urge the plates apart when the fall of the cam receives the cam follower.

14. The dispenser of claim 12 in which the clutch mechanism includes a brake clutch and a drive clutch each including a spring.

\* \* \* \* \*